United States Patent
Lee et al.

(10) Patent No.: US 6,560,474 B2
(45) Date of Patent: May 6, 2003

(54) METHOD FOR EVALUATING STRUCTURAL STRENGTH OF CANCELLOUS BONE USING X-RAY IMAGE

(75) Inventors: Sooyeul Lee, Taejon (KR); Seunghwan Kim, Taejon (KR); Hyeon-Bong Pyo, Taejon (KR); Sangkyung Lee, Taejon (KR); Seon Hee Park, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/858,685

(22) Filed: May 15, 2001

(65) Prior Publication Data

US 2002/0076090 A1 Jun. 20, 2002

(30) Foreign Application Priority Data

Dec. 14, 2000 (KR) ........................................ 2000-76649

(51) Int. Cl.[7] ................................................ A61B 5/05
(52) U.S. Cl. ..................... 600/408; 382/275; 382/132
(58) Field of Search ................................ 600/407, 408; 382/132, 168, 169, 170–173, 190; 378/54, 62; 128/922–925

(56) References Cited

U.S. PATENT DOCUMENTS

| | | | |
|---|---|---|---|
| 4,903,203 A | * | 2/1990 | Yamashita et al. ..... 364/413.15 |
| 5,247,934 A | | 9/1993 | Wehrli et al. |
| 5,751,846 A | * | 5/1998 | Higgins-Luthman et al. .... 382/169 |
| 5,784,503 A | * | 7/1998 | Bleecker, III et al. ...... 382/306 |
| 5,835,619 A | * | 11/1998 | Morimoto et al. .......... 382/132 |
| 5,931,780 A | | 8/1999 | Giger et al. |
| 6,393,160 B1 | * | 5/2002 | Edgar ......................... 382/275 |

OTHER PUBLICATIONS

Optical and Digital Processing of Radiographs for the Early Detection of Oseoporosis by I. Leighter et al. SPIE vol. 2390, pp. 102–109.

* cited by examiner

*Primary Examiner*—Henry Bennett
(74) *Attorney, Agent, or Firm*—Blakely Sokoloff Taylor & Zafman

(57) ABSTRACT

A method for evaluating a structural strength of cancellous bone and a computer readable media incorporating a program for implementing the method therein. The method includes the steps of acquiring an x-ray image and defining a region of interest on the acquired x-ray image; extracting a bone trabecular pattern in the defined region of interest; and setting an index of the structural strength of the cancellous bone using an area density of the extracted bone trabecular pattern.

9 Claims, 4 Drawing Sheets

METHOD FOR EVALUATING STRUCTURAL STRENGTH OF CANCELLOUS BONE USING X-RAY IMAGE

FIELD OF THE INVENTION

The present invention relates to a method for evaluating a structural strength of cancellous bone, which is required during the insertion of an implant within bone or during diagnosis of osteoporosis; and more particularly, to a method for evaluating a structural strength of cancellous bone using a simple X-ray image and a computer readable media incorporating a program for implementing the method therein.

DESCRIPTION OF THE PRIOR ART

The surface of bone is covered with a periosteum and the bone contains a dense cortical bone positioning in the proximity of the surface and a cancellous bone positioning in the proximity of a bone marrow. The component ratio of the cortical bone and the cancellous bone is dependent on a region in body and the osteoporosis lads to a simultaneous reduction of the cortical and cancellous bone mineral contents. In normal person, a creation and absorption of bone are in balance and thus the total bone mineral content is preserved. However, an aged person with a degraded bone creation function or a postmenopausal woman whose an estrogen secretion is degraded to result in an increased bone absorption function may be extremely vulnerable to the osteoporosis. In recent years, osteoporotic patients in young men and women are considerably increasing due to under-exercise or drug reactions. Generally, osteoporosis makes weak a structure of bone, thus invoking a fracture of spine, femur, radius and so forth, and leading to death in some fracture cases.

The reduction of the bone mineral content may be an obstacle to the success of a fracture treatment or a dental implant operation. Especially, in a dental implant operation, a bone structure where the implant is inserted should be mechanically stable so that the inserted implant is strongly fixed to the bone. The structural strength of the bone may be mainly determined by the cortical bone. However, the cancellous bone also plays an important part during the insertion of the implant within the bone. A weak cancellous bone prevents a root portion of the implant inserted within the bone from being strongly fixed to the cancellous bone, leading to a degraded bearing capacity of the implant. Accordingly, what is needed is a method for evaluating the structural strength of the cancellous bone to determine the possibility of the surgical or dental implant operation.

Conventional methods, which estimate the structural strength of the cancellous bone using an x-ray image, include a bone trabecular pattern analysis technique, a Fourier transform technique and a Fractal dimension technique.

First, the bone trabecular pattern analysis technique is a way, which examines a projection pattern of a cancellous bone presented on a simple x-ray image, to thereby determine the structural strength of cancellous bone. Although such technique is being widely used during the surgical operation, the dental implant operation and the osteoporosis diagnosis, it suffers some drawbacks that it causes a significant inter-operator variations and that a change in acquisition condition for the x-ray image significantly lowers the reproducibility by the same operator.

The Fourier transform technique is a way, which performs the Fourier transform on a bone trabecular image and analyzes Fourier components in the frequency domain, to thereby measure an orientation or density of the bone trabecular pattern. However, this technique is not effective except when a bone trabecular image does not contain any soft-tissue effect. In practice, when a thick soft tissue is overlapped as in the femoral neck, the x-ray image is extremely degraded, which, in turn, leads a sharp decrease in effectiveness of the Fourier transform technique.

The fractal dimension technique is a way, which computes a fractal dimension in the bone trabecular image to measure a structural strength of cancellous bone. Some investigations have provided a result that the cancellous bone with a high fractal dimension is more resistive against external force. However, such a result is not decisive yet.

Instead of using the x-ray image, there is a technique that utilizes a quantitative computed tomography (QCT) for measuring the structural strength of the cancellous bone. The QCT technique allows simultaneous measurements of volume and structure of the cancellous bone. Since the QCT technique provides three-dimensional bone density information, it has the ability to separately measure an actual structure and density of the cortical and cancellous bones. This is the most outstanding feature of the OCT technique and this feature can be used to measure the structural strength of the cancellous bone. However, the QCT technique suffers from a drawback that the QCT equipment is highly expensive.

In addition to the afore-mentioned methods, studies for analyzing a bone trabecular pattern presented on the x-ray image are actively in progress. The reason is that since most hospitals are equipped with an x-ray imaging system, it is not necessary to equip an additional instrument for the analysis of a bone trabecular pattern, and a digital x-ray sensor such as a charge-coupled device (CCD) is introduced to enhance a resolution and quality of image, allowing the analysis of the bone trabecular pattern with ease. Nevertheless, clinically available technique to analyze a trabecular pattern is not well developed yet. Generally, analysis of a trabecular pattern should take into account both structure and density aspects of the trabecular pattern. However, conventional methods fail to take into account both structure and density aspects of a trabecular pattern.

SUMMARY OF THE INVENTION

It is, therefore, an object of the present invention to provide a method for analyzing a bone trabecular pattern presented on an x-ray image, to thereby evaluate a structural strength of cancellous bone.

It is another object of the present invention to provide a computer readable media incorporating a program for implementing the method therein.

In accordance with one aspect of the present invention, there is provided a method for evaluating a structural strength of cancellous bone, comprising the following steps of acquiring an x-ray image and defining a region of interest on the acquired x-ray image; extracting a bone trabecular pattern in the defined region of interest; and setting an index of the structural strength of the cancellous bone using an area density obtained from the extracted bone trabecular pattern.

In accordance with another aspect of the present invention, there is provided a computer readable media incorporating therein a program for implementing the following functions of acquiring an x-ray image and defining a region of interest on the acquired x-ray image; extracting a bone trabecular pattern in the defined region of interest; and setting an index of the structural strength of the cancellous bone using an area density obtained from the extracted bone trabecular pattern.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
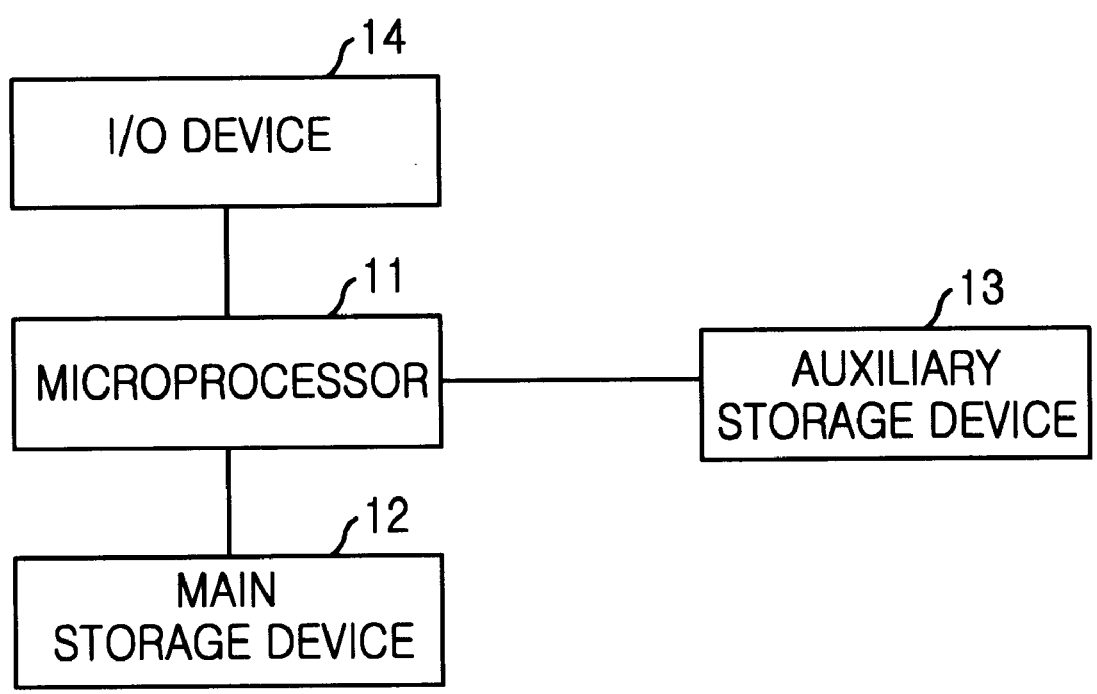
FIG. 1 is a schematic block diagram of a hardware system to which the present invention may be applied.

There is provided in FIG. 1 a schematic block diagram of a hardware system to which the present invention may be applied.

The hardware system of the present invention comprises an input/output (I/O) device 14 for interfacing data required to measure a structural strength of cancellous bone with an operator, a main storage device, 12 and an auxiliary storage device 13 for storing therein various data required during the measurement of the structural strength of cancellous bone using an x-ray image, and a microprocessor 11 for controlling the main and auxiliary storage devices 12 and 13 and the I/O device 14 to perform all the necessary operations for the measurement. The I/O device 14 includes a monitor, a printer and an x-ray film scanner for digitizing an x-ray film.

The microprocessor 11 incorporates therein a program that measures a structural strength of cancellous bone using the x-ray image, which will be described later in more detail.

A detailed description of the operation of the present invention will be given with reference to FIGS. 2 to 4.

Figure 2:
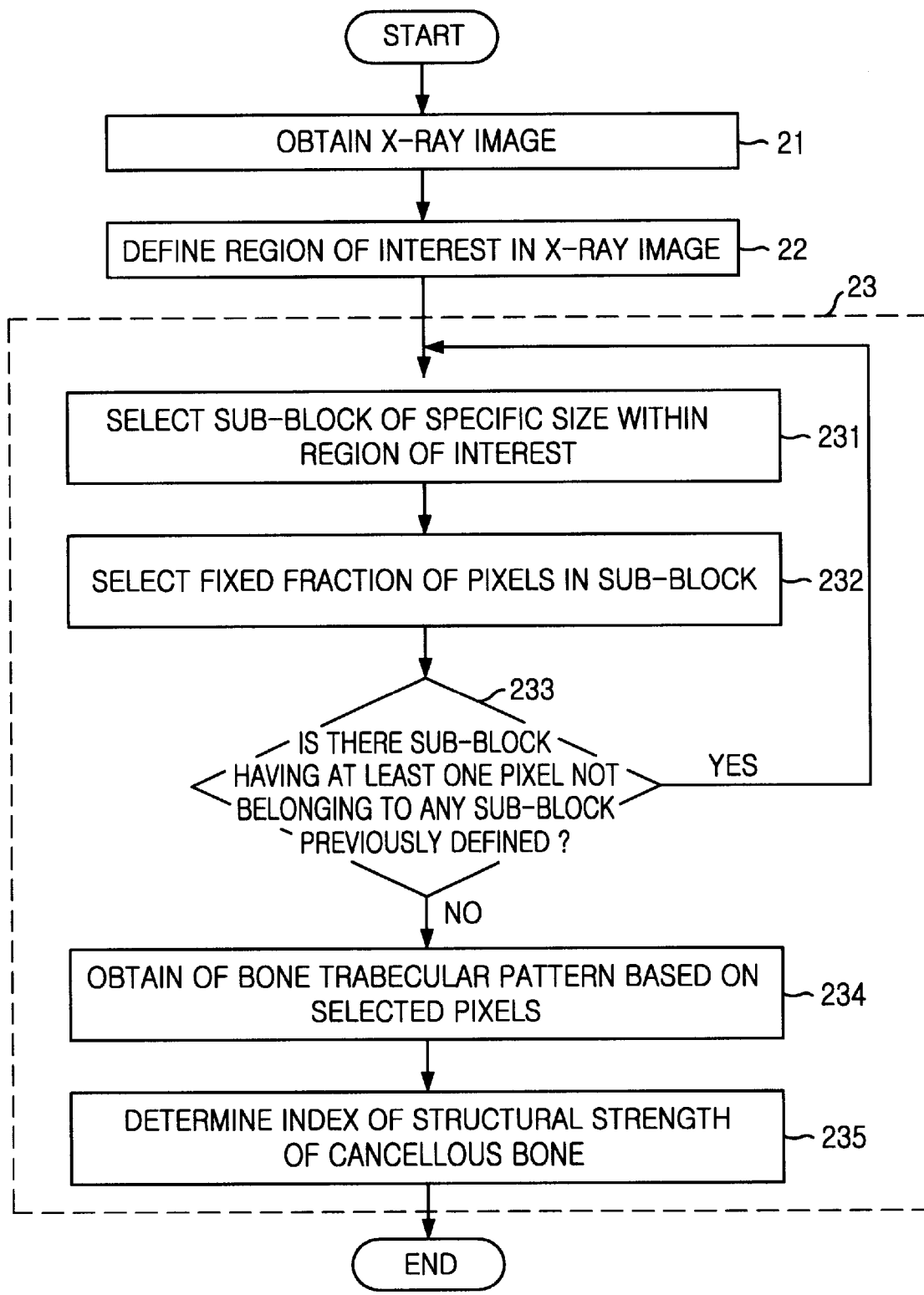
FIG. 2 is a flowchart setting forth a method for the evaluation of a structural strength of cancellous bone using an x-ray image, in accordance with a preferred embodiment of the present invention.

FIG. 2 is a flowchart setting forth a method for the evaluation of a structural strength of cancellous bone using an x-ray image, in accordance with a preferred embodiment of the present invention. FIG. 3 is an explanatory diagram showing a region of interest, which is selected to measure a structural strength of cancellous bone. FIG. 4 is an explanatory diagram showing a bone trabecular pattern, which may be extracted according to the present invention.

Referring to FIG. 2, at step 21 the x-ray image is obtained to measure the structural strength of cancellous bone. The x-ray image may be obtained by digitizing an x-ray film with an x-ray film scanner, the film being obtained by typical x-ray radiography. In this case, a spatial resolution of the x-ray film scanner is 200 PPI (pixels per inch) and each pixel has an 8-bit gray level. Since the x-ray film has a film-grain noise, resolutions exceeding 200 PPI do not enhance the quality of x-ray images but increase the size of image data.

Figure 3:
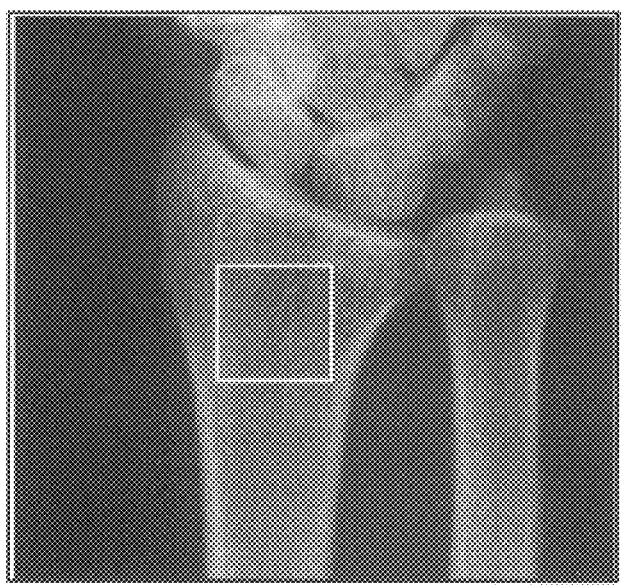
FIG. 3 is an explanatory diagram showing a region of interest, which is selected to measure a structural strength of a cancellous bone.

An example of such x-ray image is presented in FIG. 3. Each pixel in the x-ray image has a gray level, which corresponds to an intensity of x-ray beam after penetration through the human body. The intensity of the x-ray beam after penetration through the human body is determined based on a density, a thickness and components of bone and soft tissue.

At step 22, the region of interest is defined in the x-ray image for the analysis of a bone trabecular pattern. In FIG. 3, the size of the square region of interest is 100×100 pixels. At step 23, a structural strength of a corresponding cancellous bone is measured through the analysis of the bone trabecular pattern in the defined region of interest.

Bone is composed of a dense cortical part and a cancellous part placed inside the cortical bone. The cancellous bone has a network structure composed of bone plates and the network structure is represented as a bone trabecular pattern in a two dimensional x-ray image. Pixels where a bone trabecular pattern is positioned give relatively high gray levels compared with surrounding pixels. However, absolute/relative brightness of the bone trabecular pattern is not regular. Furthermore, the network structure of the cancellous bone shows significant person-to-person variation.

In accordance with a preferred embodiment of the present invention, the use of such features as mentioned above allows the bone trabecular pattern to be extracted in view of both in quality and in quantity, i.e., structure and density of the bone trabecular pattern.

In short, since the network structure of cancellous bone determines the structural strength of the cancellous bone, the structural strength of the cancellous bone may be indirectly measured by evaluating the bone trabecular pattern of the cancellous bone displayed on an x-ray image. For example, in the spine of the normal person, the network of the cancellous bone is densely developed along vertical and horizontal directions. However, in the osteoporotic person, the spinal trabecular network in the horizontal direction is predominantly destroyed and subsequently the trabecular network along the vertical direction is destroyed. In a simple x-ray image, the network of the cancellous bone appears as a two-dimensional bone trabecular pattern. Accordingly, by analyzing the two-dimensional bone trabecular pattern presented on the x-ray image, the network structure of the cancellous bone is indirectly analyzed, to thereby make it possible to estimate the structural strength of the cancellous bone.

In order to analyze a bone trabecular pattern, the trabecular pattern is extracted in the first place. One of simple techniques to extract the bone trabecular pattern is a threshold technique that utilizes a threshold of gray level to extract the bone trabecular pattern, wherein a global/local threshold is defined and pixels with gray levels higher than the threshold is determined as the bone trabecular pattern. In the above, the global threshold represents a threshold for the whole region of interest; and the local threshold represents a threshold for a small sub-block in the whole region of interest. The key point of the above threshold technique is to determine the global/local threshold. However, characteristics of each x-ray image is quite different according to its imaging condition. Thus an absolute/relative brightness of the bone trabecular pattern is varied, thereby making it difficult to determine global/local threshold.

Therefore, in accordance with a preferred embodiment of the present invention, a technique that extracts a bone trabecular pattern via a scheme using both a relative threshold technique and geometric features of the bone trabecular pattern is employed. The relative threshold is determined so that the number fraction of pixels brighter than the relative threshold becomes constant in each sub-block of the region of interest. Thus the relative threshold varies according to the sub-block. For example, a pixel in a sub-block is regarded as a portion of the extracted bone trabecular pattern if the pixel is in the group of brightest pixels of fixed fraction, i.e., 10% of all pixels in the sub-block.

Furthermore, the present invention utilizes a correlationship of a local trabecular pattern of a sub-block with local trabecular patterns of neighboring sub-blocks to thereby extract a bone trabecular pattern in the x-ray image. Accordingly, the present invention utilizes a non-local algorithm to extract trabecular pattern. In addition, since it is more preferable for an extracted bone trabecular pattern to be correlated to a density of the trabecular pattern, the present invention utilize the geometric feature of the bone trabecular pattern in the x-ray image.

A detailed description of the procedure of extracting the bone trabecular pattern according to the present invention will be given with reference to FIG. 2. At step 231, a square sub-block having 8×8 pixels is selected within the defined region of interest. The sub-block should be of fixed size. In the selected sub-block, at step 232 a fixed fraction of pixels is selected in the descending order starting from a pixel with the highest brightness. The optimum condition of the fraction depends on a region of the human body. For example, the fraction in the distal radius and the calcaneus is preferably 10%. Thereafter, at step 233, the selection procedure in step 232 is repeatedly conducted for another sub-block within the region of interest. When another sub-block is selected, at least one pixel, which does not belong to any sub-block previously defined, should be present. At step 233, if there is not any sub-block in which at least one pixel that does not belong to any sub-block previously defined is present, the control process goes to step 234 wherein the bone trabecular pattern as shown in FIG. 4 is obtained by collecting all selected pixels at the above steps 231 to 233.

Figure 4:
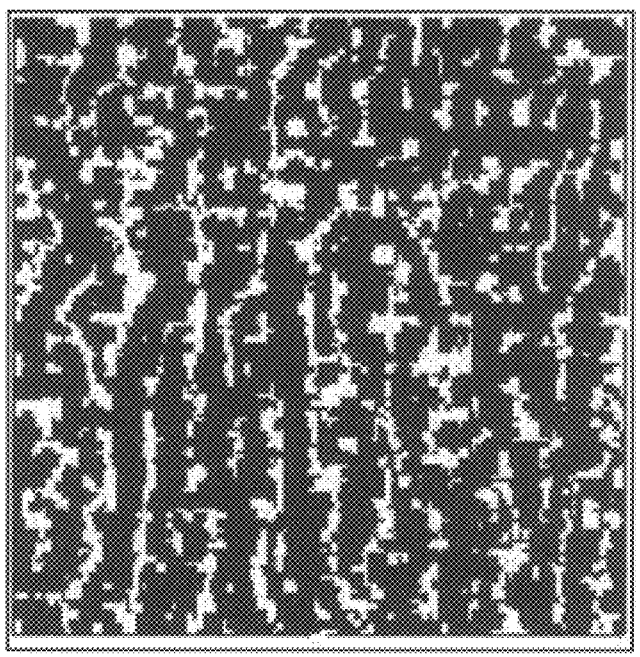
FIG. 4 is an explanatory diagram showing a bone trabecular pattern, which is extracted according to the present invention.

White pixels in FIG. 4 represent the bone trabecular pattern that is obtained by the above procedures.

At step 235, the number of pixels of the extracted bone trabecular pattern is divided by the total number of pixels in the region of interest to determine the resultant value as an index of the structural strength of cancellous bone. Generally, if the cancellous bone is structurally strong the entire bone may be also structurally strong. By the way, the strength of the entire bone may be quantified by the bone density of the entire bone. Thus, in accordance with the present invention, the index of the structural strength of cancellous bone can be validated only when the index is well correlated with an actual bone density measurement. According to a measurement of the distal radius bone mineral density with a DEXA (dual energy x-ray absorptiometry), the bone density is inversely proportional to the index according to the present invention. Therefore, it can be appreciated that the structural strength of cancellous bone increases as the index decreases. The index ranges from zero to one.

Figure 5:
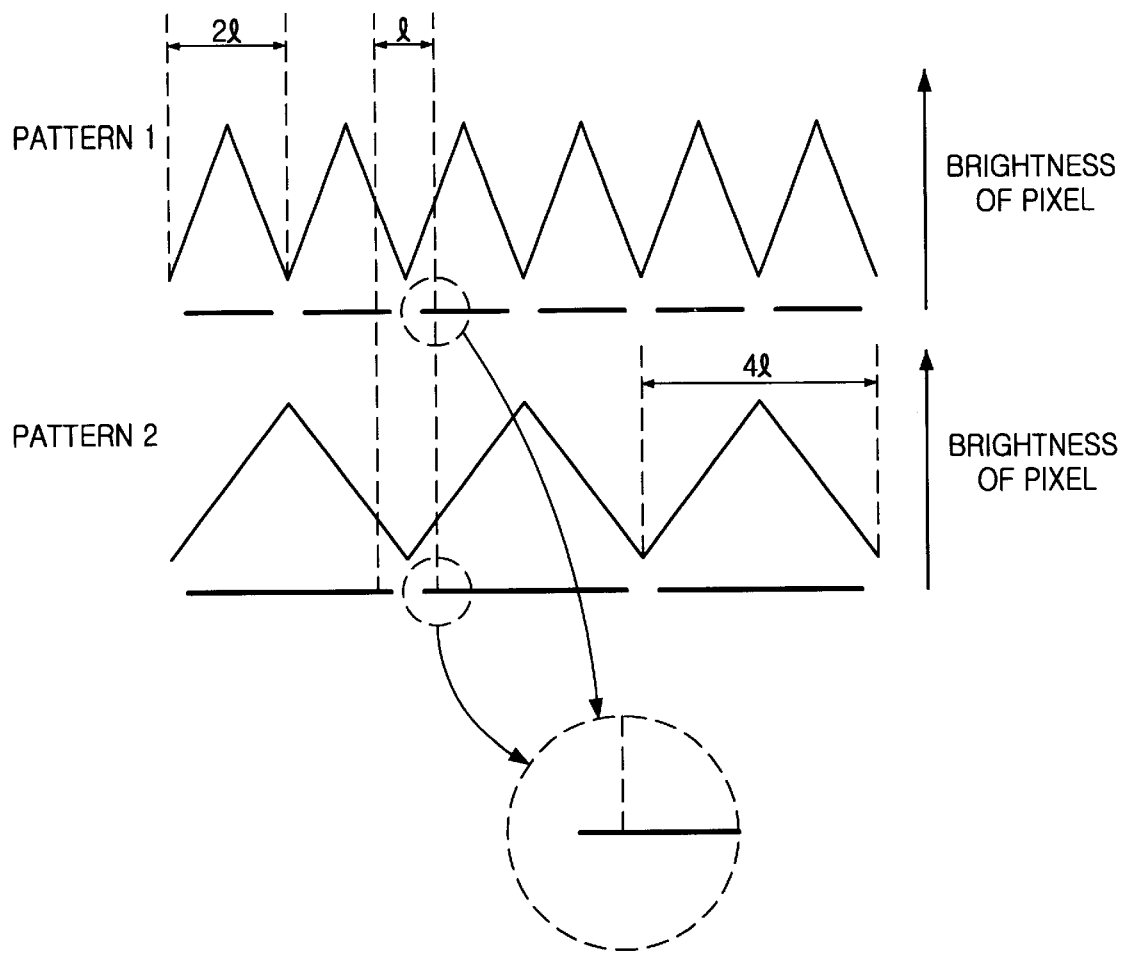
FIG. 5 is an explanatory gray level profiles across two bone trabecular patterns in which the density of bone trabecular pattern is distinct from one another.

FIG. 5 is an explanatory gray level profiles two bone trabecular patterns, wherein the density of bone trabecular pattern is different from one another.

As is apparent from FIG. 5, the method of the present invention provides information associated with structure and density of the bone trabecular pattern. In the gray level profiles shown in FIG. 5, the first profile has a period of 2 l and the second profile has a period of 4 l.

In this case, the above steps 231 to 234 may be modified as follows. That is, at step 231 an interval of size l is selected within the region of interest. In the selected interval, at step 232 a fixed fraction of pixels is selected in the descending order starting from a pixel with the highest brightness. The selection procedure is repeatedly performed for another interval within the region of interest. When another interval is selected, at least one pixel, which does not belong to any interval previously defined, should be present. At step 233, if there is no interval in which at least one pixel that does not belong to any interval previously defined is present, the control process goes to step 234 wherein a bone trabecular pattern is obtained based on selected pixels at the above steps 231 to 233. The bone trabecular pattern obtained so is indicated by a bold line at the bottom of each sawtooth-shaped profile, as shown in FIG. 5.

Finally, the above step 235 may be modified as follows. The number of pixels in the extracted bone trabecular pattern is divided by the total number of pixels to determine the resultant value as an index of the structural strength of cancellous bone. Seeing from the extracted bone trabecular pattern, it can be appreciated that trabecular lines shown in the sawtooth-shaped gray level profile in FIG. 5 may be well extracted. Furthermore, the number of trabecular lines is inversely proportional to the density of the pixels of the extracted bone trabecular pattern. Accordingly, the index of the structural strength of cancellous bone in accordance with the present invention is obtained by taking into account both aspects of the bone trabecular pattern, i.e., structure and density.

The method of the present invention as demonstrated above may be embodied as a program, which is stored in a compact disk read only memory (CD-ROM), ROM, floppy disk, hard disk, optical magnetic disk or other computer readable media.

As mentioned above, the present invention takes into account information associated with structure and density of bone trabecular pattern presented in an x-ray image, thereby making it possible to quantitatively indexing a structural strength of cancellous bone.

Moreover, the present invention has the ability to index a structural strength of cancellous bone, to thereby perform a compatibility testing for intraosseous implant operation and an osteoporosis diagnosis. Thus the present invention increases the reliability of several medical diagnoses and reduces costs of relevant medical diagnoses.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for evaluating a structural strength of cancellous bone, comprising the steps of:
    (a) acquiring an x-ray bone image and defining a region of interest on the x-ray bone image;
    (b) extracting a bone trabecular pattern in the region of interest; and
    (c) setting an index of a structural strength of a cancellous bone using an area density of the bone trabecular pattern,
    wherein said step (b) includes the steps of:
        (b1) assigning a multiplicity of sub-blocks each of which having a predetermined number of pixels, wherein each of the multiplicity of sub-blocks is allowed to be overlapped with each other within the region of interest;

(b2) in each sub-block, selecting a fixed fraction of pixels in the descending order starting from a pixel with the highest brightness; and (b3) defining the bone trabecular pattern as a collection of pixels, which are selected at the step (b2) at least one time.

2. The method as recited in claim 1, wherein the extracted bone trabecular pattern at the step (b) provides quality information associated with a structure of the bone trabecular pattern and the area density obtained at the step (c) provides quantitative information associated with a density of the bone trabecular pattern.

3. The method as recited in claim 1, wherein the step (c) of selecting the index is performed by dividing the number of pixels in the bone trabecular pattern by the total number of pixels in the region of interest.

4. The method as recited in claim 1, wherein the x-ray bone image is obtained by digitizing an x-ray film with an x-ray film scanner, the x-ray film being obtained by simple x-ray radiography.

5. The method as recited in claim 2, wherein the step (b) of extracting the bone trabecular pattern is performed by a non-local algorithm whose pattern is affected by neighboring sub-blocks in the region of interest.

6. The method as recited in claim 5, wherein the step (b) of extracting the bone trabecular pattern includes the steps of:

(b1) assigning a multiplicity of sub-blocks each of which having a fixed number of pixels, wherein each of the multiplicity of sub-blocks is allowed to be overlapped with each other within the region of interest;

(b2) in each sub-block, selecting a fixed fraction of pixels in the descending order starting from a pixel with the highest brightness; and (b3) defining the bone trabecular pattern as a collection of pixels, which are selected at the step (b2) at least one times.

7. The method as recited in claim 4, wherein a spatial resolution of the x-ray film scanner is 200 pixels per inch wherein each pixel has an 8-bit gray level.

8. The method as recited in claim 5, wherein the fixed fraction at the step (b2) for the distal radius and calcaneus is 10%.

9. Computer readable media incorporating therein a program for implementing the following functions of:

(a) acquiring an x-ray bone image and defining a region of interest on the x-ray bone image;

(b) extracting a bone trabecular pattern in the region of interest; and (c) setting an index of a structural strength of a cancellous bone using an area density of the bone trabecular pattern, wherein said step (b) includes the steps of:

(b1) assigning a multiplicity of sub-blocks each of which having a predetermined number of pixels, wherein each of the multiplicity of sub-blocks is allowed to be overlapped with each other within the region of interest;

(b2) in each sub-block, selecting a fixed fraction of pixels in the descending order starting from a pixel with the highest brightness; and (b3) defining the bone trabecular pattern as a collection of pixels, which are selected at the step (b2) at least one time.

* * * * *